UNITED STATES PATENT OFFICE.

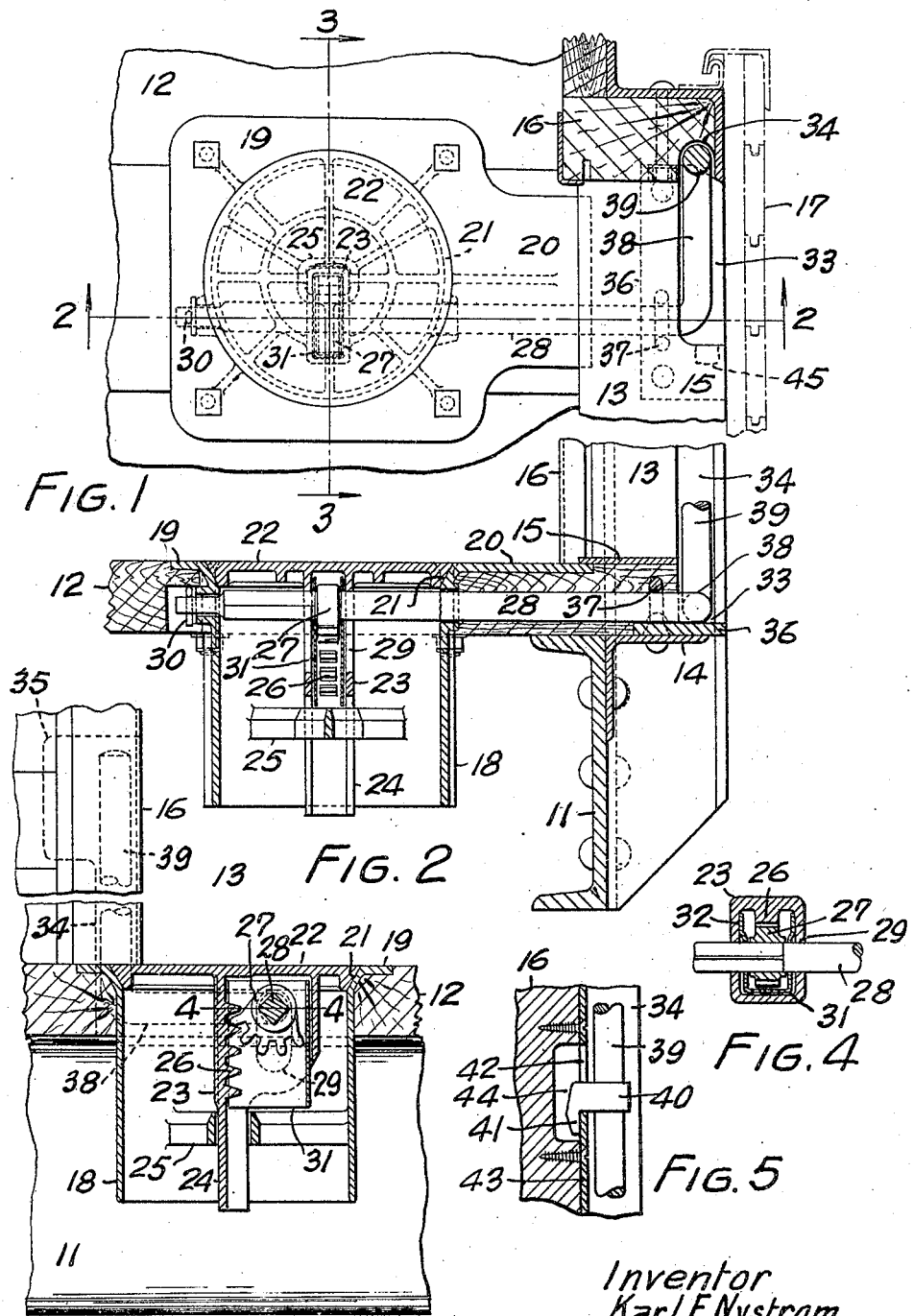

KARL F. NYSTROM, OF MONTREAL, QUEBEC, CANADA.

GRAIN VALVE.

1,404,887.   Specification of Letters Patent.   Patented Jan. 31, 1922.

Application filed February 28, 1921. Serial No. 448,281.

*To all whom it may concern:*

Be it known that I, KARL F. NYSTROM, a subject of the King of Great Britain, and resident of the city of Montreal, in the Province of Quebec and Dominion of Canada, have invented certain new and useful Improvements in Grain Valves, of which the following is a full, clear, and exact description.

This invention relates to improvements in grain valves for box cars and the like, and the object of the invention is to provide a valve having the operating means thereof so disposed as to be protected by the door of the car and to be brought under seal by the sealing of the car door, so as to eliminate the necessity of additional seals.

A further object is to provide a valve of simple and durable construction, the operating mechanism of which will not be in the way when the car is used for miscellaneous purposes.

A still further object is to provide a valve, the operating mechanism of which will not be choked or clogged by grain flowing through the valve.

The purpose of grain valves is so well known that no explanation is required. The valves ordinarily used are generally so arranged that the operating mechanism is under the car and therefore not easily inspected, so that the seal may be broken and the valve opened, an amount of grain taken from the car and the valve again closed without attracting attention to the fact that the valve has been tampered with. Valves which require a special seal are always in danger of being left unsealed. According to the present invention, the operating member of the valve is disposed in an out of the way but readily accessible position within the door of a car, so that when the car door is shut and sealed the valve is also sealed. As inner or grain doors are used to hold grain out of contact with the outer door of a car, which makes a by no means grain-tight fit with the car, it is possible to locate a handle in the thickness of the car wall. The valve proper comprises a tubular seat member let into the car floor and carrying a closure member, which is operated from the handle by means of rack and pinion mechanism.

In the drawings which illustrate the invention;—

Fig. 1 is a plan view of the device.

Figs. 2 and 3 are sections on the lines 2—2 and 3—3 respectively, Figure 1.

Fig. 4 is a section on the line 4—4, Figure 3.

Fig. 5 is a fragmentary detail view of the handle latching mechanism.

Referring more particularly to the drawings, 11 designates the side sill of a car and 12 the floor thereof, the outer end of which is supported in the doorway 13 by an angle 14 riveted to the side sill. The ends of the floor planks are protected by a plate 15 extending between the door posts 16. 17 designates the outer door of the car.

The valve body 18 is preferably a cylindrical casting having at its upper end a flange 19 supporting it on the car floor and having an extension 20 passing under the plate 15. The upper end of the body is internally machined to provide a seat 21 for a closure member 22 adapted when seated to lie flush with the flange 19, which is in turn flush with the floor. The closure member 22 is provided with a substantially centrally disposed tubular stem 23 having a reduced tail portion 24 passing slidably through a supporting spider 25 within the lower portion of the body. The hollow stem 23 is provided with an internally disposed rack 26, the pitch line of which is preferably in the exact centre of the closure member and in the axis of the body. An operating pinion or quadrant 27 is provided within the stem and is in mesh with the rack 26. The pinion is supported by and receives motion from an operating shaft 28 journalled in the body and having access to the pinion through slots 29 in the stem. The pinion is preferably cast or broached with a square hole and one end of the shaft is squared as clearly shown and of a size to correspond with the hole in the pinion. The squared portion of the shaft is reduced at its end to cylindrical form where it bears in the body and is adapted to project beyond the body and to be provided with a locking pin 30. In order to guard the teeth of the rack and pinion against clogging by grain flowing in through the slots 29, a pinion casing 31 is provided within the stem. This casing is preferably thin sheet metal bent to U-shape, as shown in Figure 4, and apertured for the passage of the shaft. The guard is of a size to fit easily between the stem and pinion with a little clearance from each. The edges of the guard are, however, outwardly offset to press tightly against the inner surface of the stem, as shown at 32, both to hold the guard centered in the stem and to prevent the passage of grain around the edges of the guard and into the rack and pinion mechanism.

The car is prepared for the valve by the provision of a slot or rabbet 33 in the outer edge of the floor boards at one side of the doorway and also by the provision of a groove 34 in the door-post, which may be enlarged at its upper end as shown at 35. A special sole plate 36 is riveted to the angle 14 to form a bottom for the slot 33 and also to carry a U-shaped member 37, which forms a bearing for the outer end of the shaft 28. The main portion of the shaft is disposed transversely of the car a short distance from the door-post 16 and extends into the recess 33. In this recess, the shaft is turned at right angles and a portion 38 extends longitudinally of the car until it enters the bottom of the door-post groove 34. The shaft then extends upwardly in the groove, forming a handle 39. As herein shown, the length of portion 38 is somewhat exaggerated but the same, in actual practice, will be substantially equal to the height of recess 33, so that when the said portion 38 is disposed vertically in the recess, the arm 39 will lie flat on the plate 15.

The handle 39 may if desired be provided with a latching device to hold it in either open or closed valve positions. This latch may be of any suitable construction but is preferably a sleeve 40 slidable and revoluble on the handle and carrying a latch-head 41 insertable through the aperture 42 of a plate 43, which may be secured at any suitable point in the bottom of the recess 34 to cover a deepening 44 of the recess adapted to receive the latch-head 41. The flooring of the car is cut away under the plate 15, as indicated at 45, to receive the latch head 41.

When assembling the device, the body 18 is set into the floor, the pinion and its guard assembled in the stem of the closure and the closure lowered into place in the body. The squared end of the shaft is then extended from the outside of the car through the bearing 37 and through the valve body, valve stem, pinion guard and pinion. The locking pin 30, when inserted, holds all the parts against separation from one another. The parts 38 and 39 forming an operating lever are normally let into the floor and door-post, as clearly shown, and are therefore entirely out of the way. When it is desired to operate the device, the latch is lifted to disengage the plate 43 and the free extremity of the handle 39 is grasped and the handle swung away from the door-post and downwardly through approximately 90°, that is, until the free extremity thereof comes to rest against the door sill. This movement rotates the pinion, which raises the rack-toothed stem 23 and consequently lifts the valve closure 22 off its seat in the body. If it is desired to lock the valve open, the sleeve 40 is rotated about the handle and then slid along to engage the head 41 under the plate 15 in the recess 45. Closing of the valve is effected by reverse movement of the handle. The rise and fall of the valve stem relatively to the shaft is permitted by reason of the slots 29 in the stem. The pinion guard does not rise and fall but remains stationary since it is carried on the shaft. The valve stem is steadied both by the shaft and by its stem 24 and thus having two spaced points of support cannot upset. The disposition of the rack with its pitch line in the geometric center of the member 22 ensures application of the opening and closing force equally to all parts of the circumference.

It will be clearly seen that the operating handle of the valve is inside the door 17, so that when this door is closed and sealed the handle is inaccessible unless the seal is broken and the door opened. The necessity of a separate locking and sealing means for the grain valve is thus overcome. When the valve is closed, the operating shaft cannot be displaced either accidentally or maliciously by removal of the pin. The only possibility of access to the interior of the car and removal of grain through the valve is therefore to force the valve up by externally applied pressure. Such pressure is beyond the strength of any man. As a matter of fact, even with no grain pressure on it, the valve could not be forced up from outside on account of the weight and length of the handle lever as compared with the very short leverage afforded by the pinion. Such a contingency is, however, met by the latching device, the primary purpose of which is to hold the lever against movement due to inertia upon the sudden stopping or starting of the car. The valve is of simple, inexpensive and durable construction and may be easily applied either to new cars in the course of building or as an attachment to existing cars.

While rack and pinion mechanism has been shown for opening and closing the valve, it will be understood that this is purely illustrative and that any other suitable mechanism may be used in combination with a handle disposed in the manner described. It will also be understood that the invention is not limited to the particular form of handle shown, as this may be modified according to the position of the valve, so as to lie in the wall only or in the floor only.

Having thus described my invention, what I claim is:—

1. In combination with a car having a door, a grain valve and an operating lever therefor normally disposed between the planes of the inner and outer surfaces of the car wall in position to be exposed for operation on opening of the car door.

2. In combination with a car including a recessed door-post and a door of a grain valve in the car, and an operating handle therefor normally located in the recess of the door-post inside the door.

3. A device of the class described, comprising a recessed door post, a recessed door sill, a grain valve located adjacent said post and sill, and an operating handle therefor normally occupying the recesses of the post and sill and adapted to be concealed by a door co-operating with the post and sill.

4. In a car, a grain valve located in the floor thereof, and an operating handle therefor disposed in the doorway of the car to be concealed by and placed under seal by the closing and sealing of the car door.

5. In combination with a car including a door sill and a floor, a grain valve set in the floor, an operating shaft for said valve, and a bearing for the shaft carried by said door sill.

6. A device according to claim 5, in which the floor stops short of the outer edge of the sill in part of the length thereof to provide a recess for the reception of an operating handle attached to the shaft.

7. In combination with a car having a recessed wall, a grain valve, and an operating handle normally disposed in the wall recess.

8. A device according to claim 7, in which the wall recess is so disposed that the handle will be concealed by and under seal by a closed and sealed car door.

9. A grain valve comprising a body having a seat at one end thereof, a closure member adapted to said seat, and rack and pinion mechanism for raising and lowering said closure member, said rack and pinion mechanism being located within the body directly beneath the closure member.

10. A grain valve comprising a body having a seat at one end thereof, a closure member adapted to said seat, a tubular stem for said closure member, a rack disposed internally of said stem and connected thereto, a pinion within the stem meshing with said rack, and operating means for said pinion.

11. In combination with a device according to claim 10, a guide in the body for the lower end of said stem, the upper end of the stem being in guiding engagement with the operating member of the pinion.

12. In combination with a device according to claim 10, a pinion casing disposed around the pinion within the stem.

13. A valve comprising a body having a seat at one end thereof, a closure member adapted to said seat, a hollow slotted stem for said closure member, a rack connected to and disposed internally of said stem, a pinion in the stem engaging said rack, an operating shaft for said pinion journalled in the body and passing through the stem slots.

14. A device according to claim 13, in which the shaft forms an upper guide for the stem in combination with a guide for the lower end of the stem carried by the body.

15. In combination with a device according to claim 13, a pinion housing mounted on the shaft within the stem and slidable relatively to the stem, said housing being disposed to form a closure for the stem slots.

16. In combination with a device according to claim 13, a pinion casing mounted on the shaft within the stem, said casing exerting outward expansive pressure against opposite walls of the stem.

17. In a grain valve, a body, a closure member, rack and pinion operating mechanism for the closure member, an operating shaft, a housing carried by said shaft enclosing the rack and pinion mechanism and serving to exclude therefrom material passing through the valve.

18. In a valve, a body having a seat, a closure member adapted to said seat, a rack-toothed stem carried by said closure member and disposed with the pitch line thereof in the axis of the closure member.

19. In combination with a car, a grain valve disposed in the car floor, an operating shaft therefor disposed in a horizontal plane and extending to the car doorway, and an operating handle connected to the outer end of said shaft including a portion disposed in a horizontal plane and lying longitudinally of the car, and an upwardly projecting portion disposed to one side of the shaft.

20. A device according to claim 19, in which the car floor and wall are recessed for the reception of the operating handle to dispose the handle normally clear of the doorway and in the thickness of the car wall.

21. In combination with a device according to claim 20, means to hold the valve handle against movement due to inertia on stopping or starting of the car.

22. In combination with a car, a grain valve comprising a body, a closure member, operating means for the closure member, and an operating handle for said operating means disposed in the car doorway to be concealed by and placed under seal by the closing and sealing of the car door.

23. A device according to claim 22, in which the operating handle is normally sunken in the car to occupy a position out of the way during normal use of the car.

24. In combination with a device according to claim 22, a releasable means adapted to hold the handle against movement due to inertia.

In witness whereof, I have hereunto set my hand.

KARL F. NYSTROM.